(12) United States Patent
Linson et al.

(10) Patent No.: US 9,644,782 B2
(45) Date of Patent: May 9, 2017

(54) WHEEL ALIGNMENT SYSTEM CABINET STRUCTURE

(71) Applicant: Hunter Engineering Company, St. Louis, MO (US)

(72) Inventors: Dennis M. Linson, St. Charles, MO (US); Mark Stirnemann, St. Louis, MO (US)

(73) Assignee: Hunter Engineering Company, St. Louis, MO (US)

( * ) Notice: Subject to any disclaimer, the term of this patent is extended or adjusted under 35 U.S.C. 154(b) by 51 days.

(21) Appl. No.: 14/519,989

(22) Filed: Oct. 21, 2014

(65) Prior Publication Data

US 2015/0108887 A1    Apr. 23, 2015

Related U.S. Application Data

(60) Provisional application No. 61/894,779, filed on Oct. 23, 2013.

(51) Int. Cl.
| | |
|---|---|
| *B62B 3/00* | (2006.01) |
| *B62B 11/00* | (2006.01) |
| *F16M 11/04* | (2006.01) |
| *F16M 11/42* | (2006.01) |
| *A47B 81/00* | (2006.01) |

(52) U.S. Cl.
CPC ........... *F16M 11/046* (2013.01); *F16M 11/42* (2013.01); *A47B 81/00* (2013.01); *F16M 2200/047* (2013.01)

(58) Field of Classification Search
CPC .................. G01B 11/275; G01B 11/2755
See application file for complete search history.

(56) References Cited

U.S. PATENT DOCUMENTS

| | | | | | |
|---|---|---|---|---|---|
| 2,854,785 | A | * | 10/1958 | Sperlich ................. | A47B 97/00 248/188.1 |
| 3,509,831 | A | * | 5/1970 | Schnetzer ............ | A47B 67/005 108/139 |
| 4,144,888 | A | * | 3/1979 | Malyshev ............ | A61B 18/201 219/121.6 |
| 4,473,074 | A | * | 9/1984 | Vassiliadis ........... | A61B 18/201 219/121.74 |
| 4,615,618 | A | * | 10/1986 | Bailey ................ | G01B 11/2755 33/203.17 |

(Continued)

OTHER PUBLICATIONS https://web.archive.org/web/20120917202814/http://www.johnbean.com/wa-v3d-el.asp—John Bean EEWA544AL model specifications publicly available at least as early as Sep. 17, 2012.*

(Continued)

*Primary Examiner* — J. Allen Shriver, II
*Assistant Examiner* — Travis Coolman
(74) *Attorney, Agent, or Firm* — Polster, Lieder, Woodruff & Lucchesi, LC (57) ABSTRACT

A machine vision vehicle wheel alignment service system console with an integrated internal structure for supporting a vertical post carrying a machine vision sensor cross member. The vertical post is secured at least partially within the confines of a base unit and has a lower end which terminates at a position which is spaced vertically above the floor of the console, adjacent to an upper surface of the base unit.

21 Claims, 6 Drawing Sheets

(56) References Cited

U.S. PATENT DOCUMENTS

| | | | | |
|---|---|---|---|---|
| 5,184,601 A * | 2/1993 | Putman | B25J 9/042 | 312/209 |
| 5,295,073 A * | 3/1994 | Celette | G01B 11/002 | 356/400 |
| 5,539,975 A * | 7/1996 | Kukuljan | B23P 21/004 | 198/346.2 |
| 5,797,503 A * | 8/1998 | Stevens | A47B 31/00 | 108/107 |
| 5,971,512 A * | 10/1999 | Swan | B25H 1/10 | 211/131.1 |
| 6,172,748 B1 * | 1/2001 | Sones | G01N 21/9054 | 356/237.1 |
| 6,661,505 B2 * | 12/2003 | Jackson | G01B 5/0025 | 33/203.12 |
| 6,997,425 B2 * | 2/2006 | Metelski | G02B 7/001 | 248/131 |
| 7,089,776 B2 * | 8/2006 | Dale, Jr. | G01B 11/275 | 33/203.18 |
| 7,121,011 B2 * | 10/2006 | Murray | G01B 11/272 | 33/203.18 |
| 7,143,552 B2 * | 12/2006 | Vander Park | A47B 83/001 | 52/220.1 |
| 7,424,387 B1 * | 9/2008 | Gill | G01B 11/272 | 33/288 |
| 8,267,261 B2 * | 9/2012 | Vanderhoek | A01G 9/143 | 108/143 |
| 8,538,724 B2 * | 9/2013 | Corghi | G01B 11/2755 | 356/139.1 |
| 9,170,101 B2 * | 10/2015 | Stieff | G01B 11/275 | |
| 2004/0035067 A1 * | 2/2004 | Vander Park | A47B 83/001 | 52/242 |
| 2004/0172170 A1 * | 9/2004 | Lesert | G01B 11/2755 | 700/279 |
| 2004/0174105 A1 * | 9/2004 | Hung | A47B 91/02 | 312/351.1 |
| 2006/0115117 A1 * | 6/2006 | Nagaoka | G06K 9/00805 | 382/104 |
| 2006/0227567 A1 * | 10/2006 | Voeller | G01B 11/2755 | 362/512 |
| 2007/0012105 A1 * | 1/2007 | Engsberg | G09B 23/32 | 73/379.01 |
| 2008/0140333 A1 * | 6/2008 | Nobis | G01B 11/2755 | 702/95 |
| 2010/0272916 A1 * | 10/2010 | Falbaum | B60S 3/042 | 427/427.2 |
| 2010/0321674 A1 * | 12/2010 | Corghi | G01B 11/2755 | 356/139.09 |
| 2011/0077900 A1 * | 3/2011 | Corghi | G01B 11/2755 | 702/150 |
| 2015/0049188 A1 * | 2/2015 | Harrell | G01B 11/2755 | 348/139 |

OTHER PUBLICATIONS https://web.archive.org/web/20130907154657/http://equipmentafrica.net/3d-aligner.htm—Europa 3D aligner images and descriptions publicly available at least as early as Sep. 7, 2013.*

John Bean product literature, "V3D-EL—Imaging Wheel Alignment System", Form No. SS3088H, May 2013, 2 pages.

Hunter Engineering Co. product literature, "Hawkeye Series Sensors—HS200CM Cabinet Mount—Installation Instructions", Form No. 6185-T, May 2010, 36 pages.

Hunter Engineering Co. product literature, "Installation Instructions for PA121 Aligner", Form No. 5666-T, Jun. 2009, 32 pages.

Hunter Engineering Co. product literature, "ProAlign Alignment Systems", Form No. 6207-1, Feb. 2013, 8 pages.

* cited by examiner

WHEEL ALIGNMENT SYSTEM CABINET STRUCTURE

CROSS-REFERENCE TO RELATED APPLICATIONS

The present application is related to, and claims priority from, U.S. Provisional Patent Application Ser. No. 61/894,779 filed on Oct. 23, 2013, which is herein incorporated by reference.

STATEMENT REGARDING FEDERALLY SPONSORED RESEARCH

Not Applicable.

BACKGROUND OF THE INVENTION

The present application is related to vehicle service system consoles, and in particular to a machine vision vehicle wheel alignment service system console with an integrated structure for supporting a vertical post carrying a machine vision sensor cross member.

Vehicle service systems, such as machine vision vehicle wheel alignment systems, generally consist of an operator workstation or console, and a set of associated sensors for acquiring vehicle measurements. For machine vision vehicle wheel alignment systems, the sensors may consist generally of a set of cameras mounted to opposite ends of a cross member in an elevated position on a vertical post secured to the floor. The cameras are oriented such that associated fields of view encompass the left and right sides of a vehicle undergoing a wheel alignment measurement procedure on a lift rack or within a vehicle service bay.

The operator workstation or console provides a structure to organize the various user interface components, such as a keyboard, a mouse, a display unit, and a printer, while containing the associated power supply components, processing system, accessory storage, and necessary electrical cable routing. Typically, the cameras mounted to the cross member are coupled to the processing system by associated electrical cables, necessitating either lengthy cable runs from the location of the vertical post to the workstation or console, or placement of the workstation or console in close proximity to the vertical post. Lengthy cable runs across a shop floor can present a trip hazard, increase clutter, are at risk of being damaged in a vehicle service shop environment, and hence are not ideal. While placement of the operator workstation or console in proximity to a vertical post may reduce the need for lengthy cable runs, the workstation or console may occupy valuable floor space in a prime location adjacent to the column, and/or lead to wasted floor space if the workstation or console cannot be positioned flush against a wall or the vertical post itself.

In some configurations, the vertical post is positioned on, but not affixed to, the workshop floor, and is instead secured along a vertical surface directly to an external side surface of an adjacently disposed operator workstation or console, such as can be seen in the Hawkeye Series HS200CM product sold by Hunter Engineering Company of St. Louis, Mo. Attachment to the external side surface of the operator workstation or console reduced the need for lengthy cable runs, but does not achieve optimal usage of the workshop floor space, as the vertical post remains outside of the housing footprint of the operator workstation or console. If the vertical post is secured to the rear external side surface of the operator workstation or console, the combined assembly cannot be positioned flush against a wall due to the protrusion of the vertical post. Furthermore, attachment of a full height vertical post to an external side surface of an operator workstation or console, which rests on a floor of a vehicle service area, significantly increases the weight the workstation or console, rendering repositioning within the shop environment difficult and potentially dangerous due to an uneven (i.e. top-heavy) distribution of mass.

In another known configuration, the vertical post is bolted to a workshop floor in an appropriate location to provide the associated cameras with the necessary fields of view. A workstation or console unit is then hung directly from the vertical post, at a height appropriate for a service technician, such as seen in the WA series column mount consoles sold by Hunter Engineering Company. With this configuration, the console is suspended above the floor, leaving the workshop floor clear of obstructions and/or electrical cable runs. However, with this type of configuration, the combination of the vertical post and the suspended workstation or console is immobile, as it must remain affixed to the workshop floor for stability.

Accordingly, it would be advantageous to provide an operator workstation or console for use in a vehicle service system, and in particular, a machine vision vehicle wheel alignment service system with an integrated camera support column, which is compact, self-contained, and which can be easily repositioned within a workshop environment. It would be further advantageous to provide such an operator workstation or console with an internal storage volume which is not significantly impacted by internal support structures necessary to secure a vertical post or camera support column carrying a machine vision sensor cross member and associated cameras.

BRIEF SUMMARY OF THE INVENTION

Briefly stated, in a first embodiment, the present disclosure provides a vehicle service system console for use with a machine vision vehicle wheel alignment system. The console consists of a base member which receives and supports a vertical post upon which a machine vision sensor cross member is disposed. Within the base member, a storage volume is defined by left and right peripheral walls, a floor, a rear cover panel, and the underside of an upper work surface atop the base member. The vertical post is received on, and secured to, an internal support structure within the base member, vertically adjacent to the upper work surface. The vertical post passes upward through, and is at least partially enclosed within, a reseted portion of the upper work surface. A front surface of the storage volume is defined by one or more doors and sliding drawer faces which provide access to the interior of the console.

In a further embodiment, the vehicle service system console includes a transport platform on which the base member is disposed. The upper surface of the transport platform defines the floor of the base member. A lower surface of the transport platform, spaced from the upper surface to provide a second storage volume, is supported on a set of casters or rollers to facilitate movement of the vehicle service system console across a workshop floor.

In yet another embodiment, the vehicle service system console base member includes left and right storage compartment doors hinged to the external surfaces of the left and right peripheral walls. Each storage compartment door encloses a peripheral storage compartment for the storage of vehicle service system accessories, contained within the footprint of the upper work surface atop the base member.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the Figures, and to FIGS. 1-4 in particular, a machine vision vehicle service system console 100 of the present disclosure is shown generally consisting of a base unit 102 mounted on a transport platform 104, a vertical post 106 extending above the base unit, and a machine vision sensor cross member 108 carried by the vertical post. The base unit include left and right peripheral side walls 110 in a laterally spaced arrangement on the upper surface 112 of the transport platform. A tray member 114 seated on a transverse support plate 116 extending across the top of the peripheral walls defines an upper work surface 115 at the top of the base unit, while the upper surface 112 of the transport platform functions to establish a floor for the base unit. The transport platform preferably 104 includes a lower surface 118 spaced vertically from the upper surface by supporting members 120. The space between the upper and lower surfaces is enclosed, and may optionally include an access 122 such as a sliding drawer or other opening. To facilitate movement of the console within a workshop, a set of casters or rollers 124 may be secured to the underside of the transport platform. Alternatively, the transport platform may be seated directly on a workshop floor, or may rest on supporting feet (not shown). Ideally, the transport platform lower surface defines a footprint which is equal to or slightly greater in dimension than the size of the upper work surface on the base unit, thereby providing a highly stable support for the base unit 102.

Figure 1:
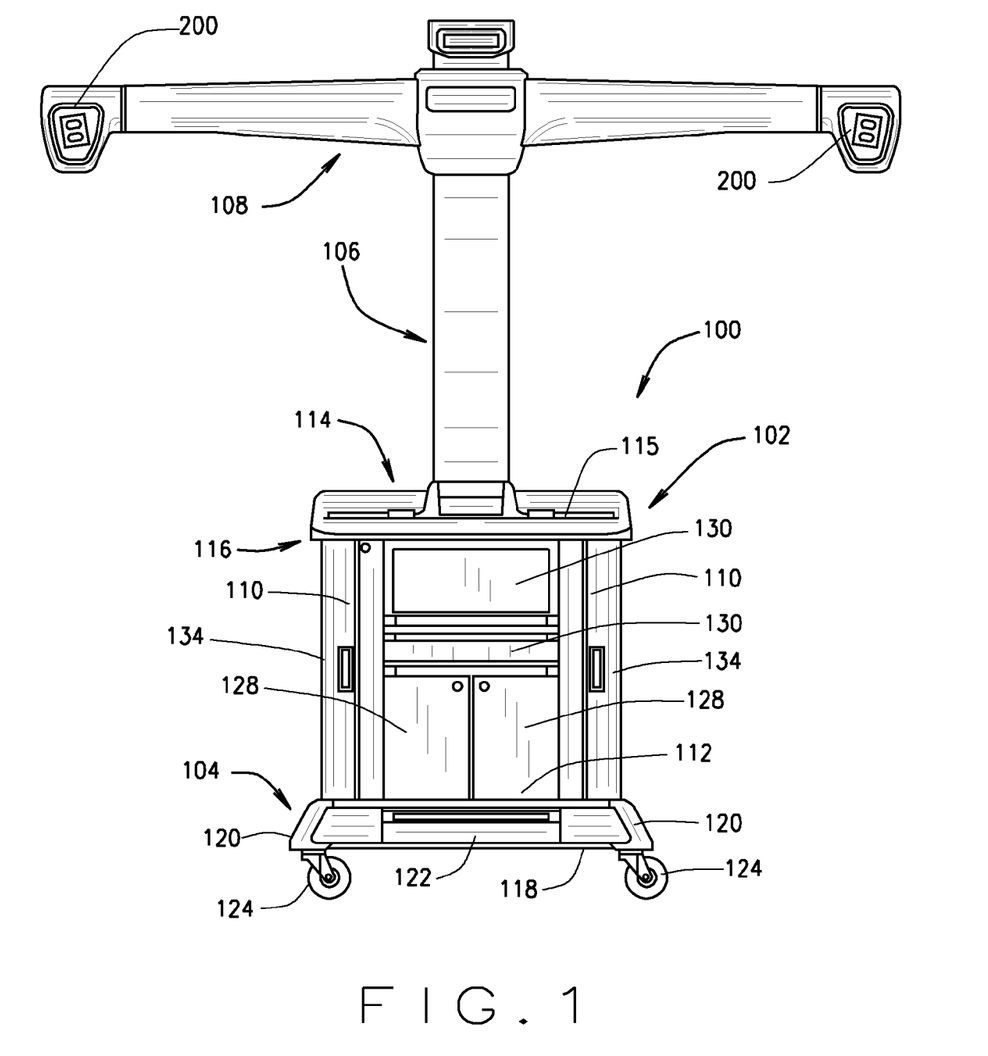
FIG. 1 is a front plan view of a machine vision vehicle service system console of the present disclosure.

The internal space within the base unit 102, enclosed by one or more rear cover panels 126 extending between the left and right peripheral side walls, defines a storage volume which may be configured in a variety of ways. For example, as shown in FIG. 1, the storage volume in the base unit may be accessed via an number of front doors 128 which are hinged to the left and right peripheral side walls, as well as a number of sliding drawers 130 which are carried on drawer tracks 132 secured to the inner surfaces of the left and right peripheral walls, and which each have a suitable drawer front and/or pull handle. The doors and drawer fronts may be made of an opaque material, such as plastic or metal, or may be made of a transparent material such as glass or an acrylic polymer.

Figure 2:
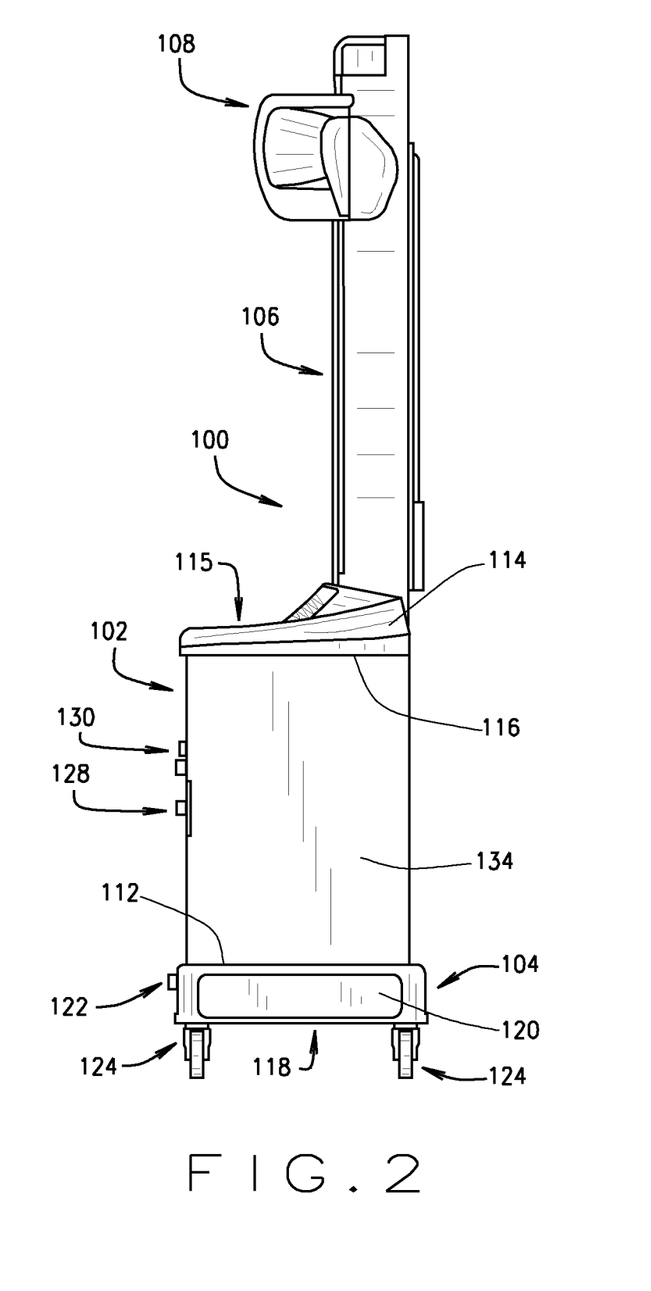
FIG. 2 is a right side plan view of the console of FIG. 1.
Figure 5:
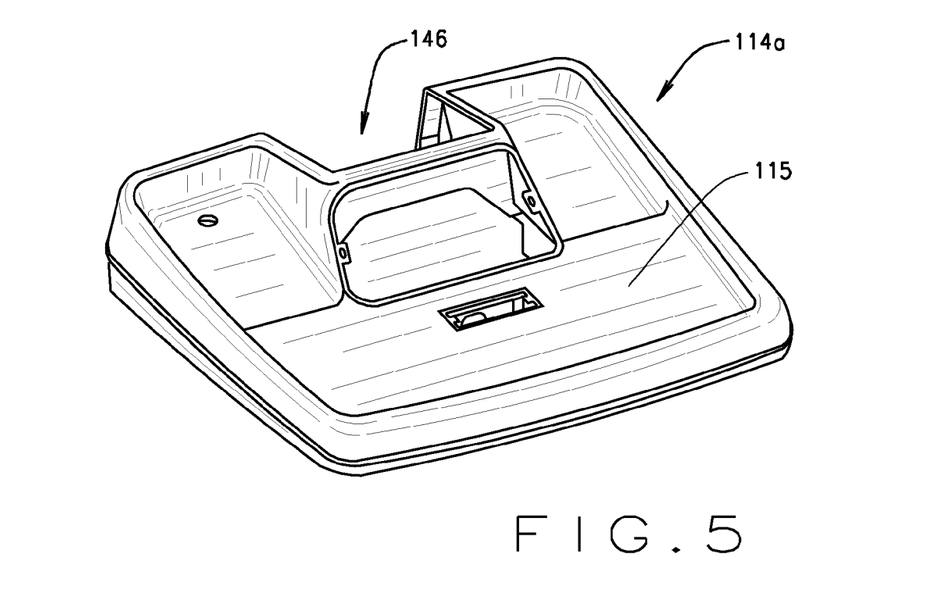
FIG. 5 is a perspective view of a first embodiment of a tray member for placement on the upper surface of a console of the present disclosure.
Figure 6:
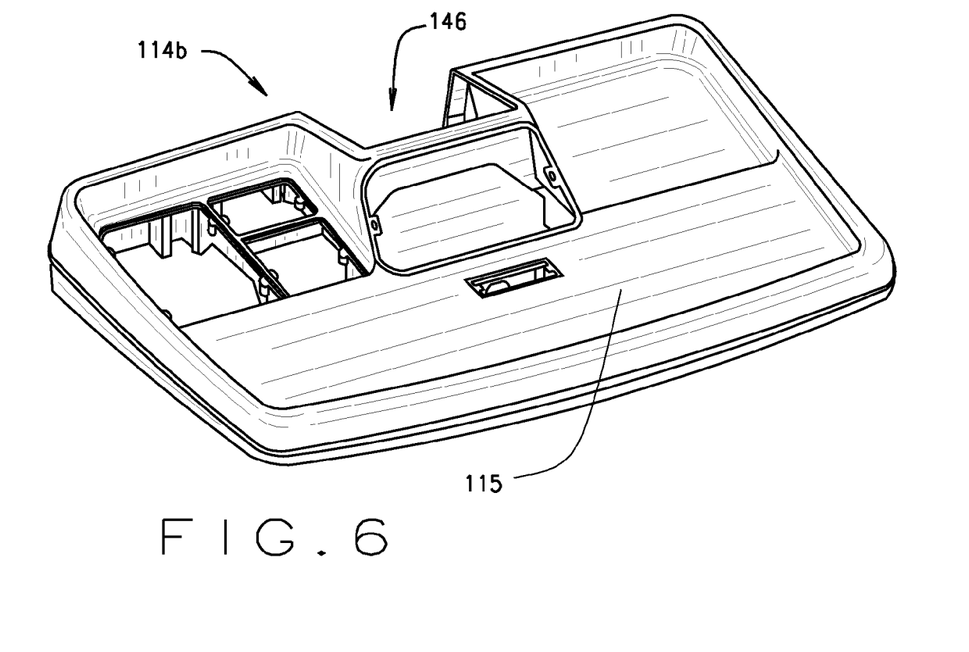
FIG. 6 is a perspective view of a second embodiment of a tray member for placement on the upper surface of a console of the present disclosure.

Additional storage compartments may optionally be provided on the external surfaces of the left and right peripheral side walls 110, accessed by suitable storage compartment doors 134 hinged to the associated side walls. As best seen in FIG. 2, these storage compartment doors 134 may each be configured to have sufficient thickness to carry internal storage pockets on an inner surface. The dimensions of the tray member 114 defining the upper work surface of the base 102 may be modified as necessary to accommodate any changes in lateral dimensions of the base unit due to the presence or absence of any installed storage compartment doors, such as shown by a comparison of tray member configurations 114*a* and 114*b* in FIGS. 5 and 6.

Figure 3:
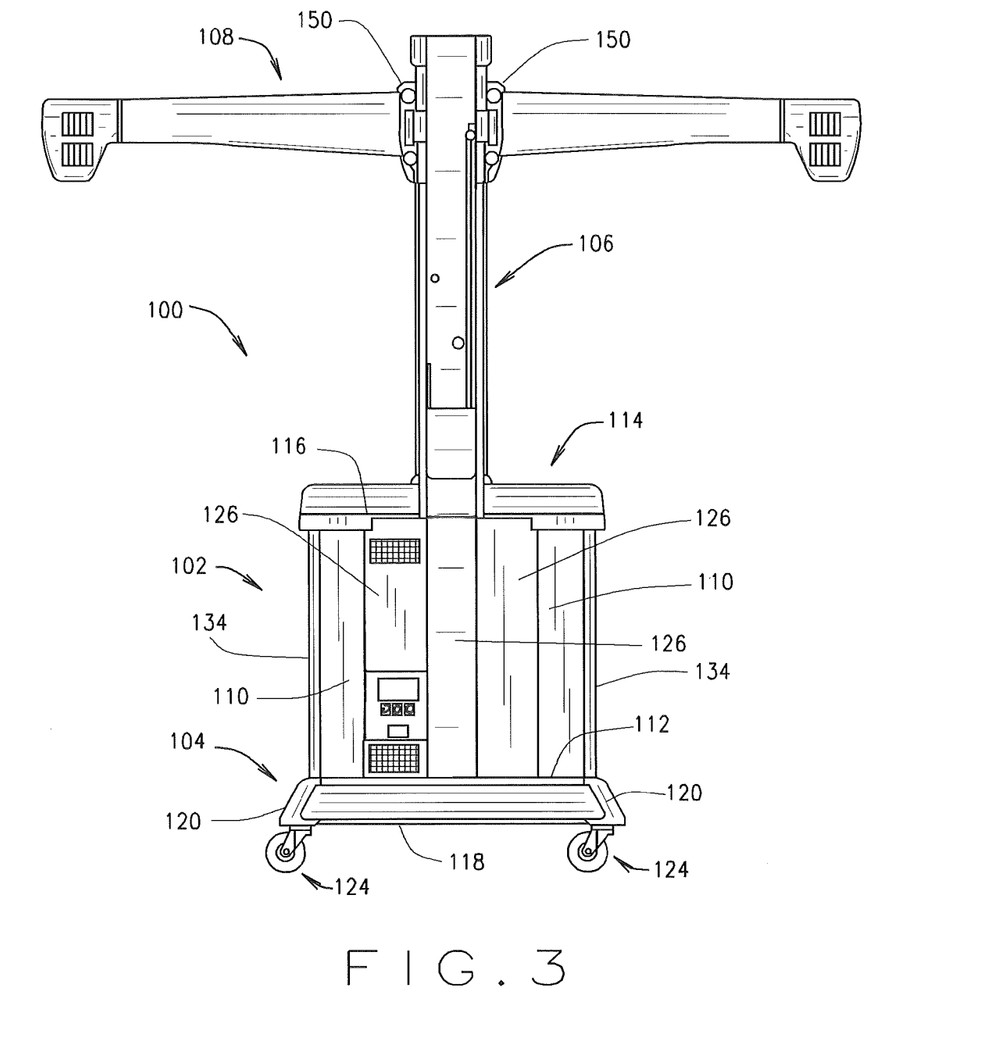
FIG. 3 is a back plan view of the console of FIG. 1.
Figure 4:
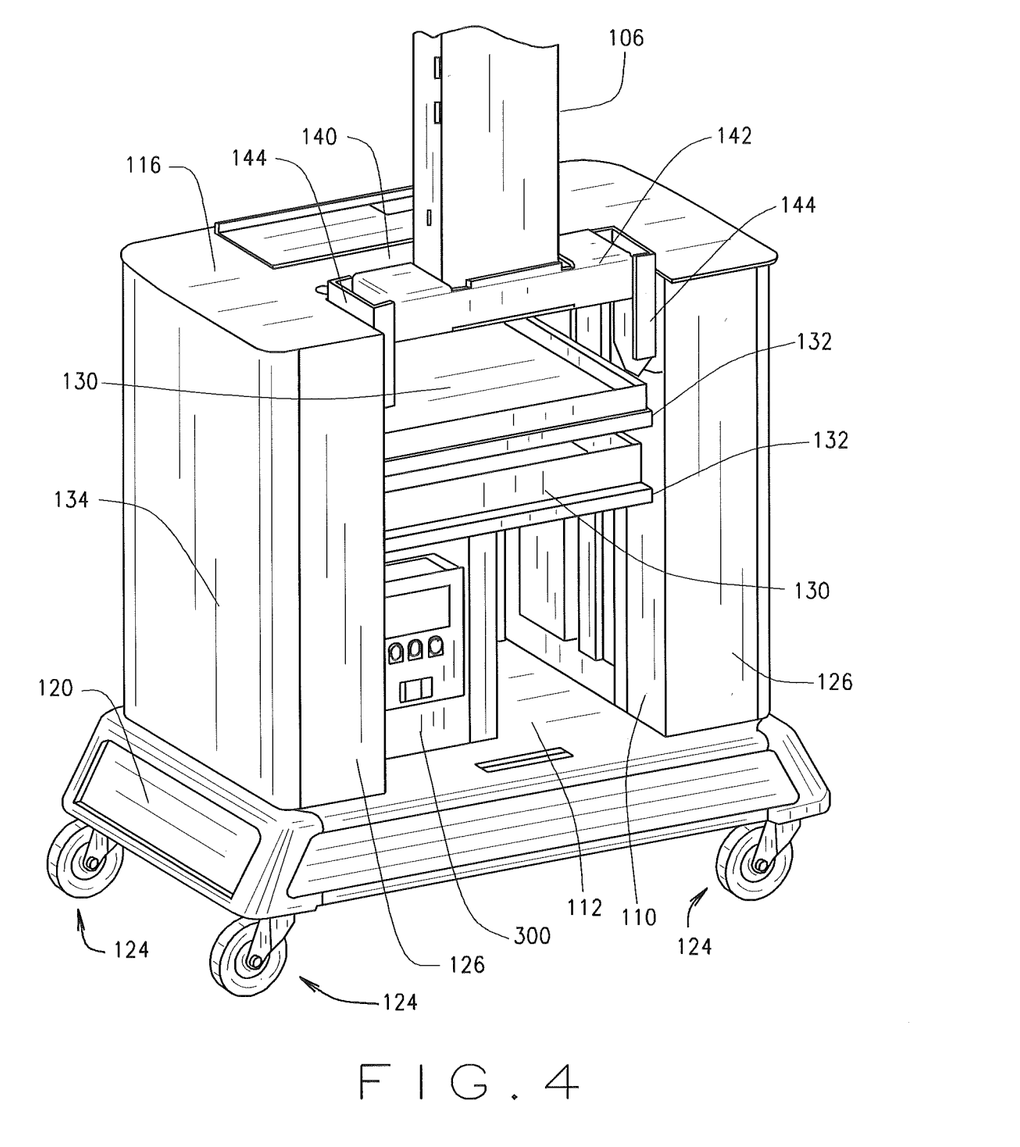
FIG. 4 is a perspective view of the back of the console of FIG. 1, with rear cover panels removed.

Turning to FIG. 4, a lower end of the vertical post 106 carrying the machine vision sensor cross member 108 is preferably laterally centered relative to the base unit 102, and is secured to the base unit 102 by mounting on an internal support structure 140 within the base unit. The internal support structure 140 consists of a transverse cross member 142 extending between left and right reinforcing flanges 144, which in turn are secured to the inner surfaces of the left and right peripheral walls 110 just below the tray member 114 and upper surface 116. When mounted on the internal support structure 140, the lower end of the vertical post 106 is spaced vertically above the floor 112 of the base unit, and does not significantly intrude into the internal storage volume of the base unit 102. Extending upward through the tray member 114 and the upper work surface 115, the vertical post 106 is recessed at least partially within a footprint defined by the outermost peripheral edges of the upper work surface 115. The tray member 114 may either surround the vertical post as it extends upward, or may include a resected portion 146 through which the vertical post extends, as best seen in FIGS. 3, 7, and 8.

By securing the lower end of the vertical post 106 to the internal support structure 140 of the base unit 102, the vertical post does not extend to the ground or other workshop floor surface on which the console 100 is disposed. Furthermore, the overall length of the vertical post 102 can be reduced by the height of the internal support structure 140 above the ground or other workshop floor surface, thereby reducing the shipping weight, package dimensions, and material requirements for the console 100. Within the vertical post 106, appropriate space may be provide for internally routing electrical cables (not shown) to provide power and communication pathways to the machine vision sensors 200 disposed on the cross member 108. The electrical cables may be routed through opens in the internal support structure of the base unit to connect directly to a power supply unit or processing system 300, such as a personal computer, which are stored within the internal storage volume of the base unit. For cross members 108 which are vertically movable along the vertical post 106, an appropriate sliding or rolling coupling 150 is provided between the cross member and the vertical post. Optionally, counterweights (not shown) are secured for vertical movement along the exterior (or interior volume) of the vertical post, and coupled to the cross member by a suitable arrangement of cables and pulleys. Proper selection and operation of the counterweights facilitates controlled movement and positioning of the machine vision sensor cross member vertically along the vertical post. The counterweights may be configured to be easily removable from quick-release connections, such as hooks, to enable the vertical post to be easily assembled and/or disassembled for shipping.

Figure 7:
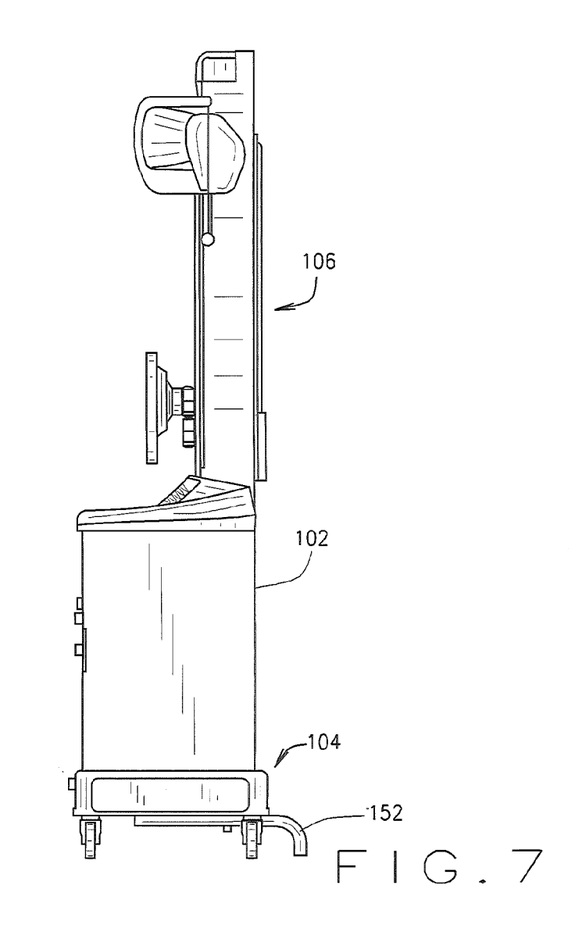
FIG. 7 is a right side plan view of a console of the present disclosure further including an outrigger positioned for increased stability.
Figure 8:
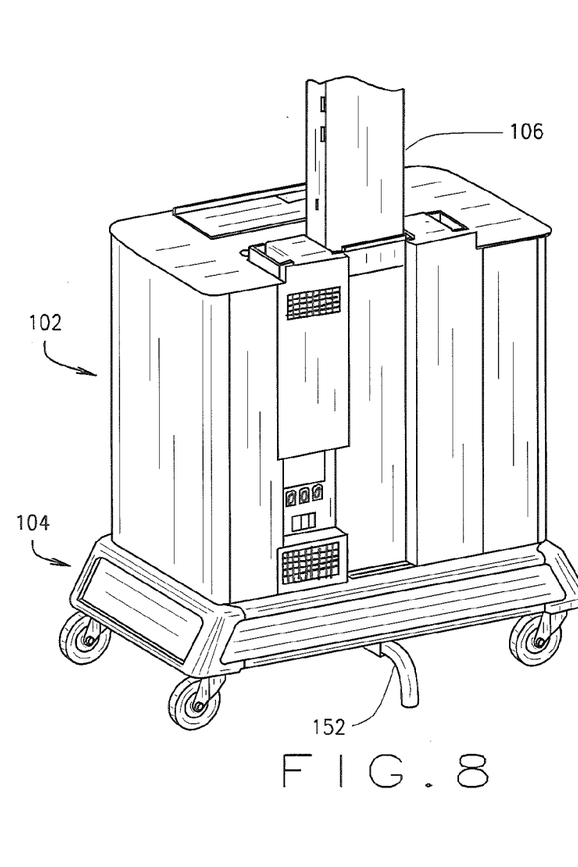
FIG. 8 is a perspective rear view of the console of FIG. 7.

In a further embodiment, shown in FIGS. 7 and 8, at least one outrigger member 152 is disposed at the rear of either the base unit 102 or the transport platform 104 to provide increased stability. Each outrigger member 152 extends outward from the base unit or transport platform and downward to the workshop floor on which the base or transport platform is disposed. If a single outrigger member is provided, it is preferably laterally aligned with the vertical axis of the vertical post 106, extending perpendicularly outward from the base unit or transport platform and downward to the workshop floor. If multiple outrigger members 152 are provided, they are preferably spaced symmetrically about the lateral centerline of the base unit or the transport platform if the vertical post is disposed on the lateral centerline, or are symmetrically spaced relative to the vertical axis of the vertical post. Each outrigger member 152 functions to increase the stability of the machine vision vehicle service system console 100, particularly when the machine vision sensor cross member 108 is vertically positioned near the upper portion of the vertical post 106. Accordingly it will be understood by one of ordinary skill in the art that the outriggers need not be aligned perpendicular relative to the base unit or transport platform, but may be angularly aligned relative there to.

Each outrigger member 152 may be permanently or temporarily secured to the base or transport platform by either a rigid connection, a sliding connection, or a pivoting connection. For some circumstances, such as during transport of the machine vision vehicle service system console 100, it may be preferable to remove any installed outrigger members 152. Alternatively, if a sliding connection to the outrigger members is provided, they may be retracted along the sliding connection towards the base unit or transport platform to reduce the overall footprint of the machine vision vehicle service system console. Similarly, if a pivoting connection to the outrigger members is provided, they may be pivoted laterally towards or against the adjacent surfaces of the base unit or transport platform to reduce the overall footprint. Alternatively, with an appropriate pivoting coupling, the outrigger members may be pivoted about a longitudinal axis, to be rotated upward away from the workshop floor surface during transport or storage.

The machine vision vehicle service system console 100 of the present disclosure provides several improvements over current console configurations. By supporting the vertical post from an internal structure 140 within the base unit 102, the console reduces the material requires for the vertical post 106, and eliminates the need for the vertical post to either rest directly on a work shop floor or be secured to a work shop floor. With the vertical post at least partially enclosed within a footprint defined by the outermost peripheral edges of the upper work surface 114, the console may be positioned in close proximity to, or abut against, a wall of the work shop, avoiding wasted space and/or the need to route electrical cables between a vertical post and a remotely located console. Placement of the internal support structure 140 supporting the vertical post at a location within the base unit 102 which is adjacent to the tray member 115 and upper work surface 114, the loss of space within the internal storage volume of the base unit 102 is reduced relative to designs which extend the vertical post down to a work shop floor surface. Finally, the placement of casters or rollers 124 on the lower surface 118 of the transport platform 104 allows the console 100, including the vertical post 106 and machine vision sensor cross member 108 to be transported from one location to another within a work shop environment without requiring structural changes, unbolting of components, or disassembly of the vertical post 106.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A machine vision vehicle service system console, comprising:
   a base unit;
   a tray member defining an upper work surface atop said base unit;
   a vertical post carrying a machine vision sensor cross member, said vertical post at least partially enclosed within said base unit;
   wherein said vertical post is coupled to, and terminates at, an internal support structure within said base unit, vertically spaced from a floor surface; and
   wherein said internal support structure is vertically below and adjacent to said tray member.

2. The machine vision vehicle service system console of claim 1 further including a transport platform for placement on said floor surface, said base unit disposed on an upper surface of said transport platform.

3. The machine vision vehicle service system console of claim 2 further including at least one outrigger support member at a rear of said transport platform, said outrigger support member extending perpendicularly outward from said transport platform to said floor surface.

4. The machine vision vehicle service system console of claim 3 wherein said at least one outrigger support member is laterally aligned with said vertical post.

5. The machine vision vehicle service system console of claim 1 further including at least one outrigger support member at a rear of said base unit, said outrigger support member extending perpendicularly outward from said base unit to said floor surface.

6. The machine vision vehicle service system console of claim 1 wherein said base unit includes a pair of laterally spaced peripheral side walls; and
   wherein said internal support structure is secured between said laterally spaced peripheral side walls.

7. The machine vision vehicle service system console of claim 1 wherein said tray member includes a peripheral edge with a recessed portion conforming to said vertical post.

8. The machine vision vehicle service system console of claim 1 wherein said internal support structure within said base unit is vertically adjacent to an upper surface of said base unit, and wherein said vertical post is terminated vertically adjacent to said upper surface of said base unit.

9. A machine vision vehicle service system console, comprising:
- a base unit with a lower surface, an upper work surface, and a pair of laterally spaced peripheral side walls each engaging the lower surface and the upper work surface, said lower surface, said upper work surface, and said pair of laterally spaced peripheral side walls cooperatively defining a storage volume;
- a vertical post carrying a machine vision sensor cross member, said vertical post extending upward from a lower end secured to an internal support structure of said base unit, said internal support structure coupled between said laterally spaced peripheral walls within said storage volume and spaced vertically above said lower surface;
- wherein said vertical post is recessed at least partially within a footprint of said base unit as defined by the outermost peripheral edges of the upper work surface; and
- wherein the peripheral edge of said upper work surface includes a recessed portion through which said vertical post extends upward from said support structure.

10. The machine vision vehicle service system console of claim 9 further including a tray member disposed above said storage volume, said tray member having an upper surface defining at least one open compartment.

11. The machine vision vehicle service system console of claim 10 wherein a peripheral edge of said tray member conforms to at least a portion of said vertical post.

12. The machine vision vehicle service system console of claim 9 further including a transport platform, said transport platform having a set of casters disposed on an underside surface for supporting said transport platform on a workshop floor, and an upper surface spaced vertically apart from said underside surface by supporting members, said upper surface defining said lower surface of the base unit.

13. The machine vision vehicle service system console of claim 12 further including at least one outrigger support member at a rear of said transport platform, said outrigger support member extending perpendicularly outward from said transport platform to said workshop floor.

14. The machine vision vehicle service system console of claim 9 wherein said machine vision sensor cross member is coupled to said vertical post by a set of rollers for vertical movement along said vertical post.

15. The machine vision vehicle service system console of claim 9 wherein said support structure includes a first flange secured to an inner surface of a first laterally spaced peripheral wall, a second flange secured to an inner surface of a second laterally spaced peripheral wall, and a transverse cross member secured between said first and second flanges, said transverse cross member receiving and securing a lower end of said vertical post.

16. The machine vision vehicle service system console of claim 9 wherein said lower end of said vertical post is vertically spaced from said lower surface.

17. The machine vision vehicle service system console of claim 9 wherein said vertical post contains a cable pathway for routing electrical cables between said machine vision sensor cross member and said storage volume.

18. A machine vision vehicle service system console, comprising:
- an enclosed base unit defining a storage volume carried on a transport platform;
- a tray member defining an upper work surface atop said enclosed base unit;
- a vertical post carrying a machine vision sensor cross member, a lower end of said vertical post spaced above an upper surface of said transport platform;
- wherein said vertical post is coupled to an internal support structure within said storage volume of said enclosed base unit, adjacent a rear panel; and
- wherein said internal support structure is vertically below said tray member.

19. The machine vision vehicle service system console of claim 18 wherein said enclosed base unit includes a pair of laterally spaced peripheral side walls; and
- wherein said internal support structure is secured transversely between said laterally spaced peripheral side walls.

20. The machine vision vehicle service system console of claim 18 wherein said vertical post contains a cable pathway for routing electrical cables between said machine vision sensor cross member and said storage volume.

21. The machine vision vehicle service system console of claim 18 wherein said machine vision sensor cross member is coupled to said vertical post for vertical movement along said vertical post.

* * * * *